United States Patent [19]

Abe

[11] Patent Number: 5,129,012
[45] Date of Patent: Jul. 7, 1992

[54] DETECTING LINE SEGMENTS AND PREDETERMINED PATTERNS IN AN OPTICALLY SCANNED DOCUMENT

[75] Inventor: Keiko Abe, Kanagawa, Japan

[73] Assignee: Sony Corporation, Tokyo, Japan

[21] Appl. No.: 496,931

[22] Filed: Mar. 21, 1990

[30] Foreign Application Priority Data

Mar. 25, 1989 [JP] Japan ................................. 1-075274
Mar. 25, 1989 [JP] Japan ................................. 1-075275

[51] Int. Cl.⁵ .............................................. G06K 9/46
[52] U.S. Cl. ........................................ 382/16; 382/9; 382/61
[58] Field of Search ................ 382/9, 61, 24, 16, 36

[56] References Cited

U.S. PATENT DOCUMENTS

| | | | |
|---|---|---|---|
| 4,292,622 | 9/1981 | Henrichon, Jr. ........................ | 382/9 |
| 4,365,235 | 12/1982 | Greanias et al. ..................... | 382/24 |
| 4,377,803 | 3/1983 | Lotspiech et al. ...................... | 382/9 |
| 4,428,077 | 1/1984 | Shimada et al. ....................... | 382/9 |
| 4,633,502 | 12/1986 | Namba ................................... | 382/9 |
| 4,741,045 | 4/1988 | Deaning ................................. | 382/9 |

*Primary Examiner*—Leo H. Boudreau
*Assistant Examiner*—David Fox
*Attorney, Agent, or Firm*—Alvin Sinderbrand; William S. Frommer

[57] ABSTRACT

Line segments in stored picture data derived from an optically scanned document are detected by detecting line elements in the picture data, determining if the length of a line element is greater than a threshold length $l_{th}$, determining a connecting relationship of one line element of greater than threshold length to another line element of greater than threshold length, and identifying a line segment in accordance with the connecting relationship of the line elements. Predetermined patterns formed of the detected line segments are detected by sensing if two line segments adjoin each other, determining the adjoining relationship of those two line segments, and identifying the pattern which includes those two line segments as a function of their adjoining relationship.

37 Claims, 6 Drawing Sheets

FIG. 2A
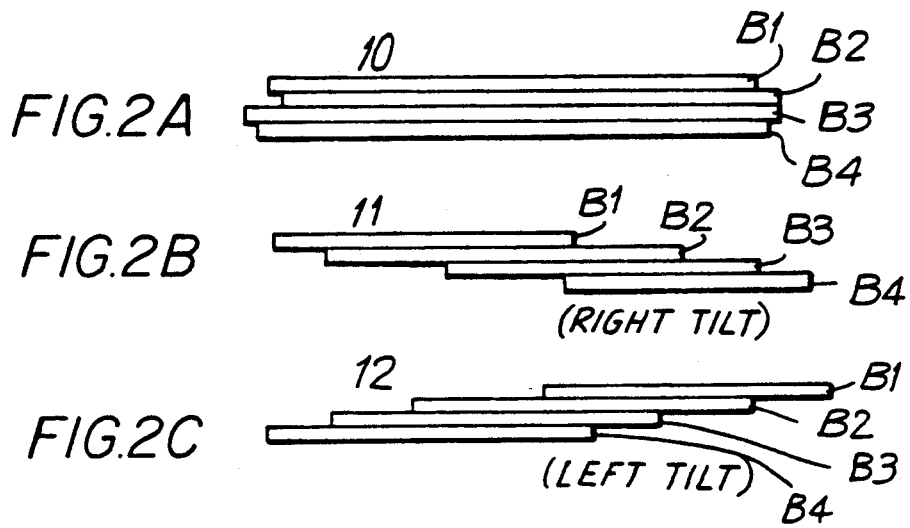
FIG. 2B
FIG. 2C
FIG. 3
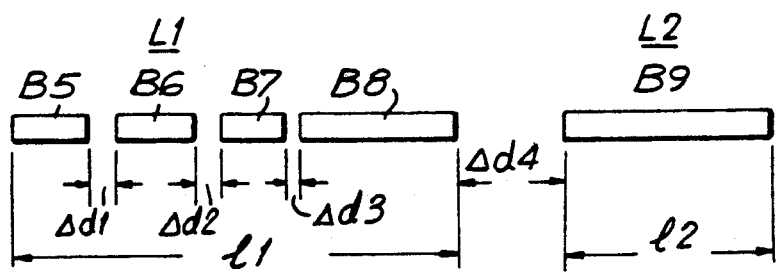
FIG. 4
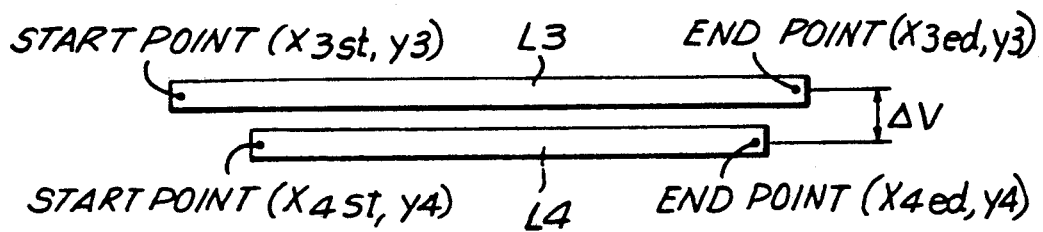

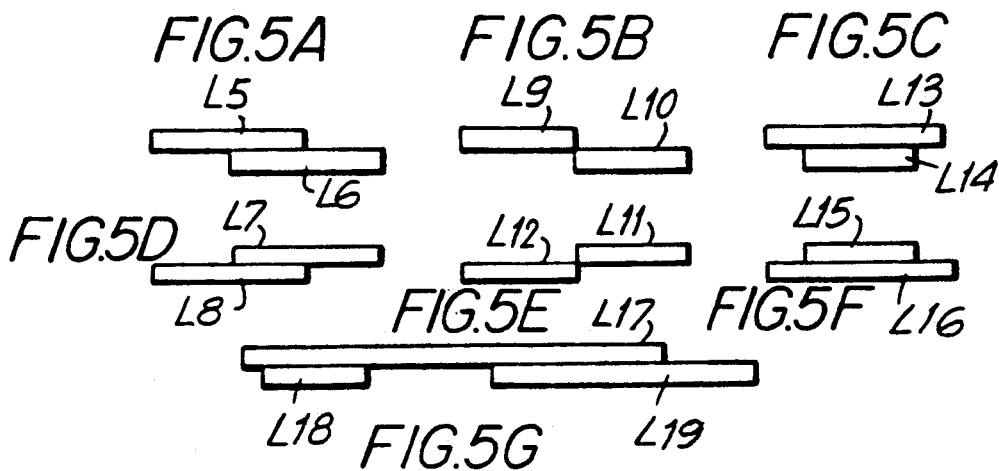
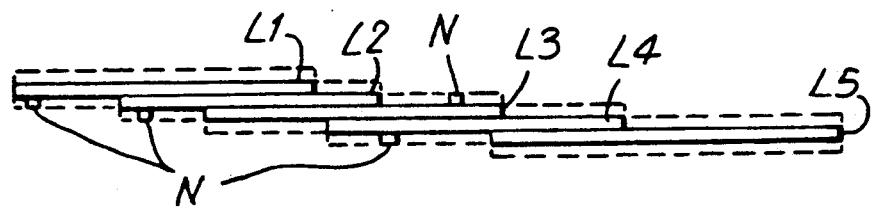
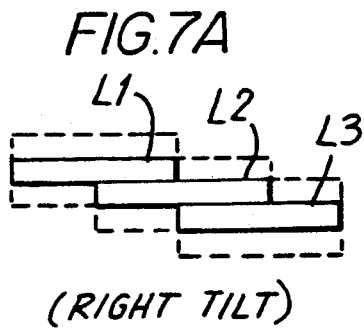
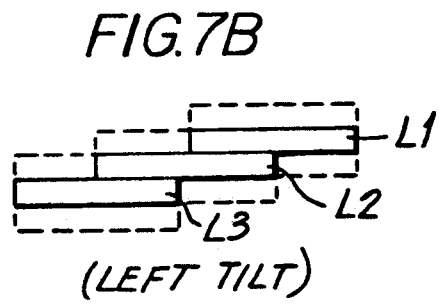

DETECTING LINE SEGMENTS AND PREDETERMINED PATTERNS IN AN OPTICALLY SCANNED DOCUMENT

BACKGROUND OF THE INVENTION

1. Field of the Invention

This invention relates to a method and apparatus for detecting line segments and particular patterns which may be present in a document and, more particularly, to such a method and apparatus having particular utility in optical character recognition wherein a document is formed of line and character indicia and wherein line indicia are discriminated from character indicia to facilitate character interpretation.

2. Description of the Prior Art

Optical character recognition has long been used for machine reading of information on a printed document to permit such information to be converted into electronic form. Typically, a document is provided with alphanumeric character indicia, punctuation indicia and line indicia, the latter usually being an underscored word or passage. To facilitate character recognition, it generally is helpful to eliminate printed lines from the document, such as the aforementioned underscoring. Of course, once a document is printed, such lines generally cannot be ignored.

Various techniques have been proposed for recognizing alphanumeric characters as well as other characters normally used to convey information by way of a printed document. Some of these techniques are described in Japanese Patent Publications Nos. 62-74181, 62-74182, 62-74183 and 62-74184. Other examples of techniques which are used to recognize printed characters are described in, for example, "Segmentation Methods for Recognition of Machine-Printed Characters", Hoffman and McCullough, IBM Journal of Research and Development, March 1971, pages 153-165; "Block Segmentation and Text Extraction in Mixed Text/Image Documents", Wahl, Wong and Casey, Computer Graphics and Image Processing, Vol. 20 (1982), pages 375-390; and "Approach to Smart Document Reader System", Masuda, Hagita, Akiyama, Takahashi and Naito, Proceedings ICTP 1985, pages 550-557. The existence of lines on the printed document, when converted into scanned image data, may detract from successful recognition of the printed characters. For example, a simple underscore may be blurred, broken or printed with non-uniform thickness. A line of this type may be erroneously interpreted as an appendant element, thus defeating the successful recognition of a nearby character.

The problem of discriminating between lines and characters is exacerbated when the line is slightly angled or tilted on the document. Moreover, lines often are printed or drawn in particular patterns, some of which patterns contain characters to be recognized and others contain graphic information, such as drawings, photographs and the like, which need not be machine-interpreted. For example, lines may be printed in a grid so as to constitute a table within which alphanumeric characters are disposed. In another example, the lines may be formed as a rectangular box, or block within which may be provided alphanumeric characters or the aforementioned graphic data. In the latter case, it is desirable to identify the block which serves as a border to the graphic data and to program the character recognition system simply to disregard all indicia within that block. For documents containing a table formed of lines, such as horizontal and vertical lines, it is desirable simply to disregard the table framework formed of those lines, thus leaving only the alphanumeric characters therein to be recognized. As described herein, such line, block and table elimination is carried out electronically on the picture data that is derived from scanning the document.

Typically, picture data is in the form of pixel information which then is translated into a bit-mapped representation of the scanned document. For example, an optical scanner may exhibit a resolution on the order of 300 dots per inch such that a typical line segment may occupy an area of the bit mapping corresponding to a width of about four dots and a length determined by the actual length of the line (for example, a line that is one inch long will occupy an area on the order of about $4 \times 300$ dots). Line detection techniques that have been proposed previously include the so-called five line method, the contour vector pair center detection method, the direction-wise black run shortest center detection method, the arc tracing method, the peripheral distribution detection method and the line density detection method. Many of these techniques require that the coordinates of the starting and ending points of the line be determined; and such coordinates are easily ascertained from the bit-mapped representation. However, non-uniform thickness of the line, resulting in different dot densities makes it difficult, if not impossible, for the aforementioned methods to detect the line accurately. For example, in some locations the line may exhibit a width of only one dot, in other locations the line may have a width of two dots, in still other locations the line may have a width of three dots, and so on. Hence, the line cannot be electronically erased correctly which, in turn, results in significant errors in character recognition.

Previous proposals for detecting patterns, such as the grid of a table or the outline of a block, generally have been applied to documents wherein graphic information, such as drawings or photographs, are contained within the table or block. Such proposals which include the so-called peripheral distribution method and the so-called enlarged contraction method, have met with little success when applied to those documents in which alphanumeric characters are enclosed within the table or block.

OBJECTS AND SUMMARY OF THE INVENTION

Therefore, it is an object of the present invention to provide an improved technique for detecting lines on a scanned document which overcomes the drawbacks, defects and disadvantages of prior proposals.

Another object of this invention is to provide an improved technique for detecting predetermined line patterns on a scanned document, which overcomes the problems associated with previous proposals.

A further object of this invention is to provide a method and apparatus for detecting and electronically deleting line-representing data from picture data derived from an optically scanned document.

An additional object of this invention is to provide an improved technique for detecting line segments in stored picture data, even though such line segments may be tilted and may exhibit non-uniform thickness.

Yet another object of this invention is to provide an improved technique for detecting and determining the size and location of each table, block or line pattern which may be present in stored picture data derived from an optically scanned document.

A still further object of this invention is to provide a technique which improves and enhances character recognition.

In accordance with this invention, line segment data is detected from picture data representing line and character indicia derived from an optically scanned document. Line elements are detected from the picture data and the length of a line element is compared to a threshold length $l_{th}$. The connecting relationship of one line element of greater than length $l_{th}$ to another line element of greater than length $l_{th}$ is determined; and a line segment is identified in accordance with the determined connecting relationship.

As one aspect of this invention, the separation, if any, between adjacent line elements is determined; and if this separation is less than a predetermined amount $\delta d$, the separated line elements are linked to form a detected line element.

As another aspect of this invention, if two line elements are vertically separated by less than a preselected amount $\delta V$, those two line elements are identified as being included in a line segment.

As a still further aspect of this invention, the horizontal relationship between those line elements vertically separated by less than $\delta V$ is determined. More particularly, if the horizontal location of the starting point of one line element is disposed at or between the horizontal locations of the starting and ending points of an adjacent line element, both line elements are considered to be part of a common line segment.

As still another aspect of this invention, the area occupied by the identified line segment is enlarged by expanding the horizontal location of the starting point of one line element to be substantially equal to the horizontal location of the starting point of another line element and by expanding the horizontal location of the ending point of that other line element to be substantially equal to the horizontal location of the ending point of the first-mentioned line element. The line segment occupying the thus enlarged area then may be electronically deleted from the stored picture data, thereby leaving substantially only character indicia to be recognized.

In accordance with another feature of this invention, the stored picture data is effectively rotated by approximately 90° and then line elements are detected from the rotated picture data. The length of each such line element is determined; and if this length is greater than $l_{th}$, the connecting relationship of one line element of length greater than $l_{th}$ to another line element of length greater than $l_{th}$ is determined. A line segment then is identified in accordance with the connecting relationship of these line elements. As a result, horizontal and vertical line segments are identified.

As an aspect of this feature, the adjoining relationship between horizontal and vertical line segments is determined; and the particular pattern formed of such line segments is identified as a function of the adjoining relationship.

As an aspect of this feature, the adjoining relationship is determined by sensing if horizontal and vertical line segments cross, connect or form a corner with each other. The pattern formed of these line segments is identified as a table pattern if the segments cross or connect, a block pattern if the segments form a corner and a line pattern if the segments are non-adjoining.

As yet another aspect of this feature, the adjoining relationship of several horizontal and vertical line segments is determined and, depending upon the particular segments which cross, connect or form corners, the size and location of each table, block and line pattern in the scanned document is determined.

In the preferred implementation of this invention, a processor, such as a CPU, microprocessor, or the like, is programmed to carry out those functions mentioned above.

As used herein, the expressions "horizontal" and "vertical", when referring to line elements, line segments or directions, should be broadly interpreted and need not be limited solely to directions respectively parallel and perpendicular to the horizon. Rather, horizontal and vertical are understood to refer to two orthogonal axes. Nevertheless, for convenience and in order to simplify the understanding of the present invention, the words "horizontal" and "vertical" are used throughout to provide the reader with a ready perception of directions across a scanned document.

BRIEF DESCRIPTION OF THE DRAWINGS

The following detailed description, given by way of example, and not intended to limit the present invention solely thereto, will best be understood in conjunction with the accompanying drawings in which:

FIGS. 2A-2C are schematic representation of various configurations of line elements as may be sensed by an optical scanner;

FIG. 3 is a schematic representation of the horizontal connecting relationship of line elements which may constitute a line segment;

FIG. 4 is a schematic representation of the vertical connecting relationship of line elements which may constitute a line segment;

FIGS. 5A-5G are schematic representations of various connecting relationships of line elements which, nevertheless, constitute a line segment;

FIG. 6 is a schematic representation of the manner in which the area defined by line elements included in a common line segment is expanded preparatory to being deleted from picture data so as to facilitate character recognition;

FIGS. 7A and 7B are schematic representations of the manner in which the area occupied by a multi-element line segment is expanded, notwithstanding right tilt or left tilt of the segment;

DETAILED DESCRIPTION OF PREFERRED EMBODIMENTS

As mentioned above, the present invention finds particular application in character recognition systems. The purpose of the invention is to detect lines, such as character underlining, the grid work of a table or the outline of a block, and then effectively delete those lines to facilitate accurate character recognition. The particular technique or algorithm used for character recognition forms no part of the present invention per se. Likewise, the manner in which picture data representing line and character indicia is derived from a document may be conventional. Thus, optical scanning techniques known to those of ordinary skill in the art may be used to scan a document, generate picture data representing that document and store that picture data for line segment detection, line erasure and character recognition purposes. Indicia picked up from the scanned document is, for example, represented as pixels; and a suitable storage device, such as a RAM, functions as a bit-mapped memory corresponding to such pixel picture data.

Conventional scanning devices are used to scan a document; and in one embodiment the scanner exhibits a resolution on the order of about 300 dots per inch (dpi). These scanning dots constitute the pixels which, in turn, are converted into a bit-mapped representation of the scanned document. A suitable programmable processor (or CPU) such as a microprocessor, for example, a conventional microprocessor manufactured by Intel Corp., Motorola Corp., Hitachi, NEC, or the like, processes the picture data to detect line elements, line segments, table or block patterns, and to recognize characters represented by the picture data. Since the scanning and storing of picture data derived from the optically scanned document are conventional, further description and illustration of the apparatus used to obtain and store that picture data are not provided herein.

Figure 1A:
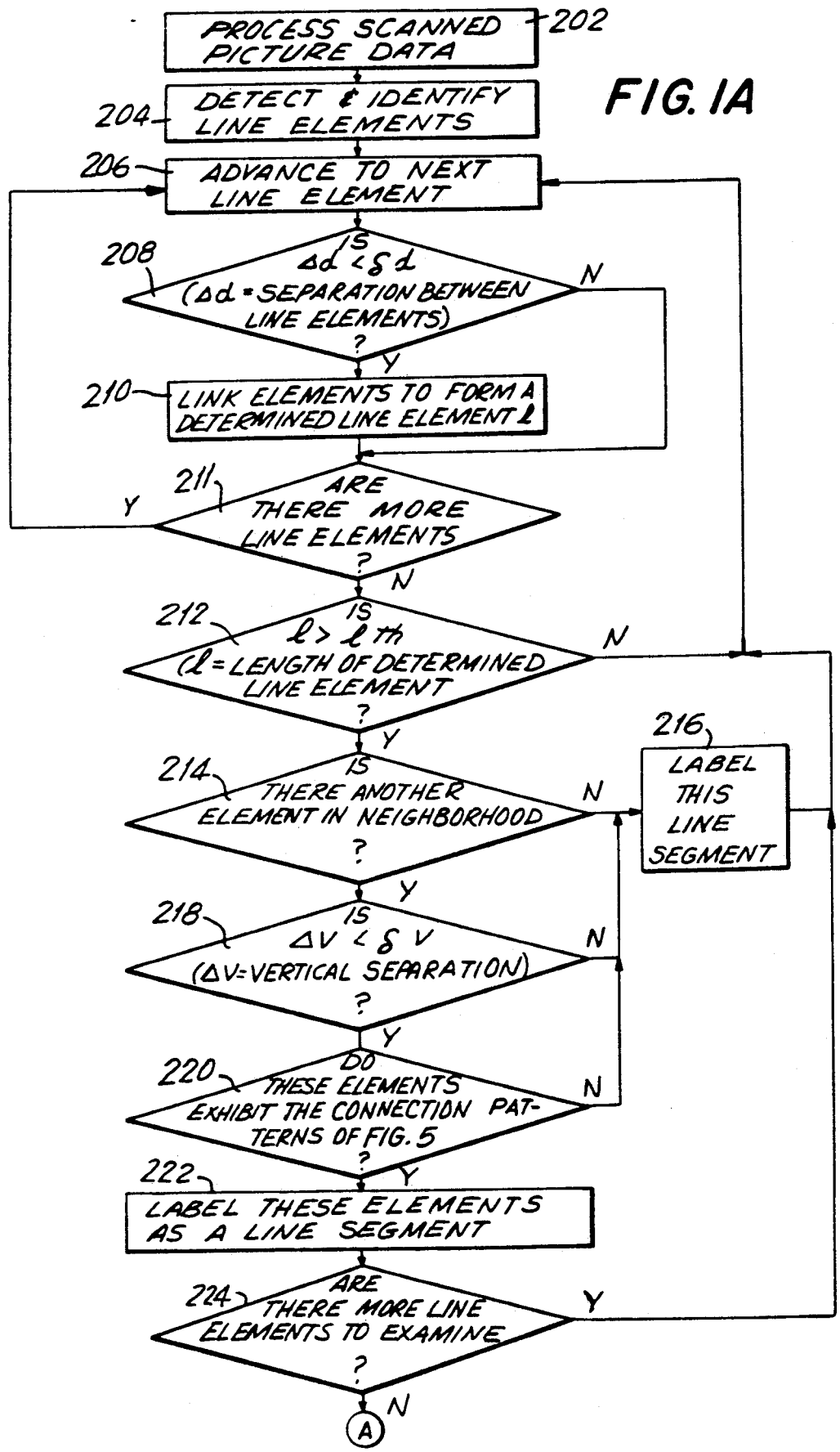
FIGS. 1A-1C represent, in combination, a flow chart describing the manner in which line segments are detected and processed in accordance with the present invention to facilitate character recognition.
Figure 1B:
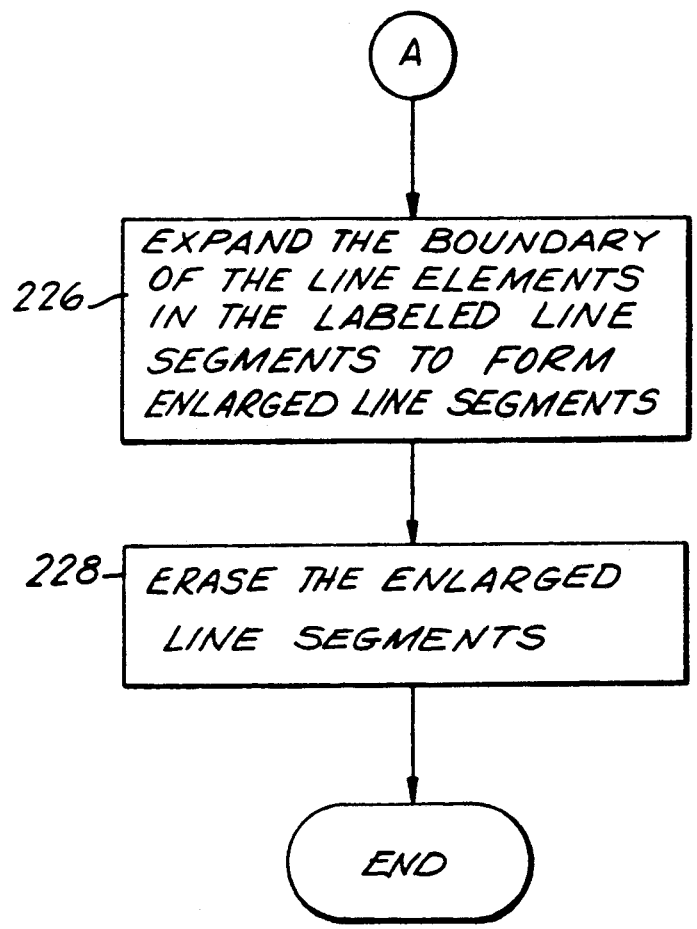
Figure 1C:
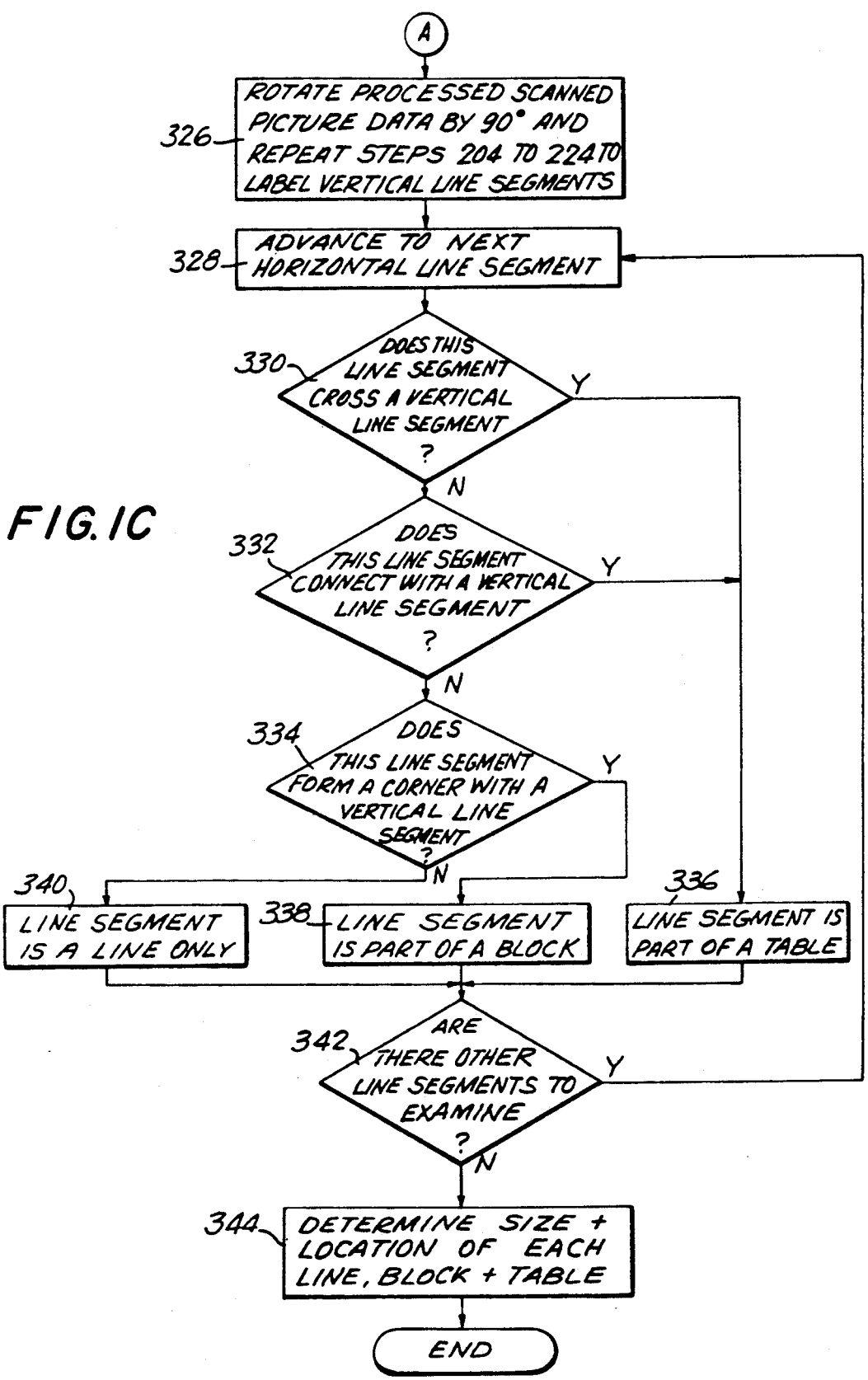

Accordingly, the description of the present invention is directed more particularly to the operation of the processor which executes the routines illustrated by the flow charts of FIGS. 1A, 1B and 1C on the stored picture data. Turning to FIG. 1A, the routine commences with instruction 202 by which the stored picture data is processed such that the horizontal and vertical coordinate locations of each pixel are identified. The expressions "horizontal" and "vertical" are intended to have the broad meanings defined hereinabove. Thus, the horizontal and vertical coordinate locations are those coordinate values assigned to the respective pixels in the bit-mapped representation of the scanned document. Assuming that the document consists of a dark indicia on a light background, a binary "1" represents the dark indicia at a bit-mapped location and a binary "0" represents the background.

After processing the stored picture data, the routine advances to instruction 204 to detect and identify individual line elements. For example, several adjacent pixels aligned generally in the horizontal direction comprise a line element. FIG. 3 is illustrative of line elements B5, B6, B7, B8 and B9. It is appreciated that each such line element is formed of a plurality of continuous pixels. As a further example, each such line element may exhibit a width, or thickness, of only one dot (it is recalled that, in one embodiment, the optical scanner used to scan the document admits of a resolution on the order of 300 dpi). Accordingly, instruction 204 serves to detect and identify line elements B5-B9, as shown in FIG. 3.

The illustrated routine then advances to instruction 206 such that the processor advances to the next line element. In the present example, it is assumed that the pixels which constitute line element B5 are examined; and then the processor advances to the next line element B6. Inquiry 208 then is made to determine if the separation $\Delta d_1$ between these adjacent line elements B5 and B6 is less than a predetermined amount $\delta d$. If this inquiry is answered in the affirmative, as will occur when the separation between elements B5 and B6 is less than $\delta d$, the routine advances to instruction 210 to link these elements. Thus, the space between line elements B5 and B6 is "filled in" in the bit map.

Thereafter, inquiry 211 is made to determine if there are more line elements to be examined on this horizontal axis. If so, the routine returns to instruction 206 and the aforementioned operations represented by inquiry 208, instruction 210 and inquiry 211 are repeated. As a result of this loop, line elements B5, B6, B7 and B8 are linked because it is assumed that the separation $\Delta d_1$, $\Delta d_2$ and $\Delta d_3$ between these elements each is less than $\delta d$. The linked elements B5-B8 form a line element $L_1$ having a length $l_1$.

After advancing to element B8, as aforementioned, and linking element B8 to element B7 to form the line element $L_1$, inquiry 211 once again is made. From FIG. 3, it is seen that yet another element B9 awaits examination. Hence, after linking element B8 to element B7, inquiry 211 is answered in the affirmative and the routine returns to instruction 206 and advances to the next element B9. It is seen that element B9 is separated from element B8 by the distance $\Delta d_4$. Inquiry 208 is made to determine if this separation $\Delta d_4$ is less than $\delta d$. Let it be assumed that this predetermined amount $\delta d$ corresponds to eight dots of the scanner resolution. In the example shown in FIG. 3, the separation $\Delta d_4$ is greater than eight dots. Accordingly, when examining element B9, inquiry 208 is answered in the negative. The routine then advances to inquire, at 211, if still further line elements on this horizontal axis remain to be examined. In the example, shown in FIG. 3, it is assumed that inquiry 211 is answered in the negative.

At this stage in the routine described herein, line element $L_1$ having length $l_1$ is formed, as is line element $L_2$ having length $l_2$. The routine then advances to inquiry 212 to determine if the length of each of these line elements is greater than a threshold length $l_{th}$. Thus, the length $l_1$ is compared to the threshold length $l_{th}$ and the length $l_2$ is compared to the threshold length $l_{th}$. In one embodiment, the threshold length $l_{th}$ is equal to about 90 dots of the scanner resolution, thus permitting an underline to be distinguished from a hyphen "-". If the length of a line element L is greater than the threshold length $l_{th}$, that line element remains identified as a line element. However, if the length of the line element L is not greater than the threshold length $l_{th}$, that element no longer is identified as a line element.

If inquiry 212 is answered in the negative, that is, if the length l of line element L is less than the threshold length $l_{th}$, the line element L is declassified, that is, it no longer is recognized as a line element, and the routine returns to instruction 206. However, if inquiry 212 is answered in the affirmative, the line element L remains classified as a line element. The processor then advances to inquire, at 214, if there is another line element similar to aforementioned elements B5, B6, etc. in the "neighborhood" of a classified line element L. For example, and with reference to FIG. 2, if a line element B1 has been detected, inquiry 214 determines if another line element, such as line element B2 vertically spaced from and adjacent to line element B1, is present. If inquiry 214 is answered in the negative, that is, if there are no other line elements in the neighborhood of the determined line element B1, the routine advances to instruction 216 so as to label this determined line element B1 as a line segment. The routine then returns to instruction 206 and the foregoing operation is repeated.

If inquiry 214 is answered in the affirmative, as will occur when line element B2 is detected after line element B1 has been determined, the processor advances to inquire, at 218, if the vertical separation $\Delta V$ between these line elements B1 and B2 is less than a preselected amount $\delta V$. For example, and with reference to FIG. 4, if line element $L_4$ is in the neighborhood of just-determined line element $L_3$, but these two line elements are adjacent but not adjoining (i.e. they are near but do not "touch" each other), then the vertical separation $\Delta V$ is sensed. It will be appreciated that line elements $L_3$ and $L_4$ may be vertically separated because the line elements may be blurred or because of the particular characteristics of the scanner. Nevertheless, if these two line elements $L_3$ and $L_4$ are sufficiently close, the line elements are part of the same line segment. As an example, if $\Delta V < 2$ dots, then line elements $L_3$ and $L_4$ may be thought of as being included in the same line segment.

FIG. 4 also illustrates the manner in which the length $l$ of a line segment may be measured. After linking line elements that may be separated, as by linking line elements B5-B8 to form line element $L_1$, or after determining that a separate element should not be linked, such as line element $L_2$, the length of each line element may be measured by sensing the horizontal coordinate location of its starting point and the horizontal coordinate location of its ending point. For example, line element $L_3$ is assumed to be a horizontal line having horizontal and vertical coordinate locations $x_{3st}$ and $y_3$ to define its starting point and having horizontal and vertical coordinate locations $x_{3ed}$ and $y_3$ to define its ending point. The difference between these coordinates, and particularly the difference between the starting point horizontal coordinate $x_{3st}$ and the ending point horizontal coordinate $x_{3ed}$ may be easily determined. Thus, the length of line element $L_3$ is measured.

If the vertical separation $\Delta V$ between line elements $L_3$ and $L_4$ is less than $\delta V$, inquiry 21B is answered in the affirmative and the routine advances to inquiry 220. However, if inquiry 218 is answered in the negative, that is, if the vertical separation $\Delta V$ between line elements $L_3$ and $L_4$ exceeds the preselected amount $\delta V$, the routine proceeds to instruction 216 and line element $L_3$ is labeled as a line segment. Then, the routine returns to instruction 06 such that line element $L_4$ next is examined and processed in the manner described above.

However, if inquiry 218 is answered in the affirmative, as when the vertical separation between line elements $L_3$ and $L_4$ is less than $\delta V$, the routine advances to inquire, at 220, if these elements exhibit any one of the connection patterns shown in FIGS. 5A-5G. These connection patterns demonstrate the various connecting relationships of one line element to another (assuming, of course, that each line element is of a length greater than the threshold $l_{th}$). It is appreciated that these connecting relationships take into account the possibility that one line element in the neighborhood of another may be longer than that other line element, may be shifted to the left relative thereto or may be shifted to the right. Although FIGS. 5A-5G illustrate the connecting relationship between two adjacent line elements, it will be appreciated that the connecting relationship of several elements which constitute a common line segment may be determined in the same manner as the connecting relationship between only two line elements. For example, four line elements B1-B4 may exhibit the connecting relationships shown in FIGS. 2A, 2B or 2C; but, nevertheless, the connecting relationship of one line element to the next exhibits one of the possibilities shown in FIGS. 5A-5G. That is, four separate line elements B1-B4 may exhibit the "stacked" vertical relationship shown in FIG. 2A, wherein some elements are longer than others. Alternatively, the vertically arrayed line elements B1-B4 may exhibit a "tilt" to the right, as shown in FIG. 2B, or a "tilt" to the left, as shown in FIG. 2C. A line segment composed of plural line elements exhibits a tilt when those line elements are not aligned precisely along the horizontal scanning axis. It is expected, then, that in many applications, a tilt in the line elements will be sensed.

Comparing FIGS. 2A-2C to FIGS. 5A-5G, it is seen that stacked, unequal line elements of the type shown in FIG. 2A correspond to the arrangement of line elements shown in FIGS. 5C and 5F; the right tilt of line elements shown in FIG. 2B correspond to the arrangement shown in FIGS. 5A and 5B; and the left tilt shown in FIG. 2C corresponds to FIGS. 5D and 5E.

Inquiry 220 is carried out by sensing if the horizontal coordinate of the starting point of one line element is disposed at or between the horizontal coordinates of the starting and ending points of a vertically adjacent line element. Thus, and with respect to the horizontal coordinates thereof, FIG. 5A illustrates the starting point of line element $L_6$ disposed between the starting and ending points of line element $L_5$. This is similar to the relationship between line elements B1 and B2 in FIGS. 2A and 2B. FIG. 5B illustrates the starting point of line element $L_{10}$ disposed at the ending point of line element $L_9$. FIG. 5D illustrates the starting point of line element $L_7$ disposed between the starting and ending points of line element $L_8$. This is similar to the relationship between line elements B2 and B3 in FIG. 2A as well as the relationship between line elements B1 and B2 or between B2 and B3 or between B3 and B4 in FIG. 2C. FIG. 5E illustrates the starting point of line element $L_{11}$ disposed at the ending point of line element $L_{12}$.

FIG. 5C illustrates the starting point of line element $L_{14}$ disposed between the starting and ending points of line element $L_{13}$. Similarly, FIG. 5F illustrates the starting point of line element $L_{15}$ disposed between the starting and ending points of line element $L_{16}$. The relationship between line elements B3 and B4 in FIG. 2A is seen to be similar to the connecting relationship between line elements $L_{13}$ and $L_{14}$ in FIG. 5C.

Finally, FIG. 5G illustrates a compound connecting relationship between line elements $L_{17}$, $L_{18}$ and $L_{19}$. Assuming that each of these line elements exhibits a length greater than the threshold $l_{th}$ and that the vertical separation between line element $L_{17}$ and each of line elements $L_{18}$ and $L_{19}$ is less than $\delta V$, it is seen that elements $L_{17}$ and $L_{18}$ are included in the same line segment because the starting point of element $L_{18}$ is disposed between the starting and ending points of element $L_{17}$. Likewise, elements $L_{17}$ and $L_{19}$ are included in the same segment because the starting point of element $L_{19}$ is disposed between the starting and ending points of element $L_{17}$. In one embodiment, even though the separation $\Delta d$ between elements $L_{18}$ and $L_{19}$ may be greater than $\delta d$, these elements nevertheless may be linked in a common segment because of the relationship of each to element $L_{17}$.

If vertically separated line elements do not satisfy any of the connection patterns illustrated in FIG. 5, inquiry 220 is answered in the negative and the routine returns to instruction 216. Thus, the vertically separated elements are separately labeled as individual line segments. But, if inquiry 220 is answered in the affirmative, the line segment comprised of these individual line elements, such as line segment 10 of FIG. 2A, line segment 11 of FIG. 2B, line segment 12 of FIG. 2C or any of the line segments represented by the line elements exhibiting the connection patterns shown in FIGS. 5A–5G, is labeled as a line segment, as represented by instruction 222.

Thereafter, the routine advances to inquiry 224 to determine if there are further line elements included in the bit-mapped picture data to examine. If so, the routine returns to instruction 206 and the foregoing operation is repeated. However, if all line elements have been examined, the processor advances to the routine illustrated in FIG. 1B.

Before proceeding with a discussion of the flow chart shown in FIG. 1B, further explanation is provided regarding the labeling of line segments. As mentioned above, the processor identifies those individual line elements which, in combination, constitute a line segment. Examples of such line segments are shown in FIGS. 2A–2C. Preferably, those vertically arrayed line elements which are included in a common line segment are identified by their respective scan line numbers, which also correspond to vertical coordinates $y_i$, together with the starting point and ending point coordinates of each line element, such as the horizontal coordinates $x_{st}$ and $x_{ed}$, respectively. If the bit-mapped representation of the picture data is thought of as comprising rows and columns, then the respective x and y coordinates of those elements which constitute a line segment may be stored in a segment table as follows:

| Segment | Y-coordinate line number | x-coordinate of the start point | x-coordinate of the terminal point |
|---|---|---|---|
| 1 | 80 | 1270 | 1694 |
|   | 81 | 1082 | 1694 |
|   | 82 | 1082 | 1694 |
|   | 83 | 1082 | 1665 |
| 2 | 81 | 778 | 979 |
|   | 82 | 420 | 979 |
|   | 83 | 368 | 979 |
|   | 84 | 368 | 979 |
|   | 85 | 368 | 497 |
| 3 | 189 | 1082 | 1694 |
|   | 190 | 1082 | 1694 |
|   | 191 | 1082 | 1693 |
| 4 | 190 | 538 | 979 |
|   | 191 | 368 | 979 |
|   | 192 | 368 | 978 |
|   | 193 | 369 | 483 |
|   | 193 | 492 | 609 |
| 5 | 243 | 802 | 1764 |
|   | 244 | 137 | 1764 |
|   | 245 | 137 | 1764 |
|   | 246 | 137 | 1225 |
|   | 247 | 136 | 531 |

Once the respective line segments are identified, labeled and stored, such as in a look-up table, the area occupied by each line segment is expanded so as to encompass noise components which frequently are located adjacent various ones of the detected line elements and which may appear as artifacts, such as spurious bits representing darkened areas. It is recalled that the line segments are identified by the present invention in order to erase them from the bit-mapped representation of the scanned document, thus facilitating character recognition. By expanding the area actually occupied by each labeled line segment, the aforementioned artifacts or "noise" may be effectively removed.

Turning to the flow chart shown in FIG. 1B, the manner in which the area occupied by an identified line segment is enlarged now will be explained. Instruction 226 is carried out to expand the boundary of each line element included in the segment so as to form an enlarged line segment. FIG. 6 schematically illustrates the manner in which the boundaries of the respective line elements are expanded. Let it be assumed that line segments $L_1$, $L_2$, $L_3$, $L_4$ and $L_5$ constitute a line segment. Let it be further assumed that artifacts, or noise N appear adjacent various ones of these line elements. Boundary expansion of the respective line elements is carried out as follows:

The horizontal location of the starting point of line element $L_2$ is expanded to be substantially equal to the horizontal location of the starting point of line element $L_1$, as represented by the broken line adjacent the starting point of element $L_2$. In addition, the horizontal location of the ending point of line element $L_1$ is expanded to be substantially equal to the horizontal location of the ending point of line element $L_2$. This too is depicted by the broken line adjacent the ending point of element $L_1$.

In a similar manner, the horizontal location of the starting point of line element $L_3$ is expanded to be substantially equal to the horizontal location of the starting point of line element $L_2$; and the horizontal location of the ending point of line element $L_2$ is expanded to be substantially equal to the horizontal location of the ending point of line element $L_3$. This process is repeated for each of the line elements, thus enlarging the area actually occupied by the line segment so as to encompass the artifacts or noise N. Hence, when the area-expanded line segment is deleted from the stored bit-map array of the scanned document, artifacts N will not remain.

If desired, the upper and lower vertical limits of the area actually occupied by the line segment may be expanded by, for example, one scan line. Thus, and as shown in FIG. 6, the scan line above line element $L_1$, which is assumed to be blank, may be darkened in the bit map array and, similarly, the scan line below line element $L_5$, which also is assumed to be blank, likewise may be darkened. As a result, the upper and lower boundaries of the area occupied by the expanded segment are enlarged, as represented by the broken lines.

FIGS. 7A and 7B are simplified illustrations of the manner in which the area of a line segment having right tilt or left tilt and formed of three line elements $L_1$–$L_3$ is expanded. The middle line element $L_2$ is enlarged such that its starting point is aligned with the starting point of upper line element $L_1$ and its ending point is aligned with the ending point of lower line element $L_3$. The ending point of upper line element $L_1$ is expanded to be aligned with the ending point of middle line element $L_2$; and the starting point of lower line element $L_3$ is expanded to be aligned with the starting point of middle line element $L_2$.

After expanding the area occupied by the line segment, the processor advances to instruction 228 whereby the expanded area of each line segment is erased from the stored bit map array. Thus, underlining and artifacts adjacent underlining may be erased to facilitate recognition of the characters remaining in the picture data. Even if the underlining exhibits a tilt, such as shown in FIGS. 2B and 2C, 6 and 7, such tilted line segments nevertheless may be effectively erased. If desired, and depending upon the use and functions of the system in which the aforedescribed processor is used, each identified line segment may be moved from one location of the document to another, or it may be reoriented, or it may be enlarged or contracted.

The flow chart discussed above in conjunction with FIG. 1A functions to identify horizontal line segments. Vertical line segments may be identified by using the same algorithm simply by effectively rotating the stored picture data by 90°. Such data rotation is a function easily performed by known algorithms. Thus, both horizontal and vertical line segments may be detected. To detect such vertical line segments, the routine illustrated in FIG. 1A is repeated by the processor, for example, after inquiry 224 (FIG. 1A) is answered in the negative; and this is shown in FIG. 1C.

As illustrated in FIG. 1C, instruction 326 is executed, whereby the scanned picture data is rotated by 90° and then the routine illustrated in FIG. 1A is repeated so as to identify and label the respective vertical line segments that may be present in the document. It is appreciated that a look-up table similar to the aforementioned segment table, may be generated to identify each vertical line segment. In such a vertical segment table, the scan line number corresponds to the x-coordinate and the starting and ending points of each vertical line correspond to respective y-coordinates.

The purpose of the flow chart shown in FIG. 1C is to detect particular patterns which may be formed of the horizontal and vertical line segments. In the embodiment described herein, those patterns which are detected are known as a "table pattern", formed of a grid of horizontal and vertical line segments, a "block pattern" formed of an outline of horizontal and vertical line segments, and a "line pattern" formed simply of a horizontal or vertical line segment (i.e. one that does not contact an orthogonal line segment).

Figure 8A:
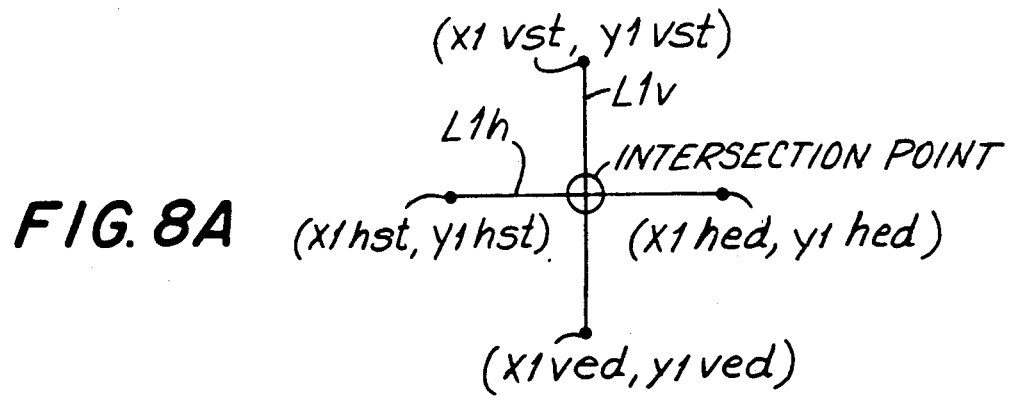
FIGS. 8A-8C schematically represent the adjoining relationship of horizontal and vertical line segments that are arranged in predetermined patterns.

After identifying the respective horizontal and vertical line segments, the processor advances to instruction 328 to examine the next horizontal line segment which has been identified (or stored in the segment table). Initially, of course, the first identified line segment is examined. Inquiry 330 then is made to determine if this horizontal line segment crosses a vertical line segment. More particularly, the adjoining relationship between this horizontal line segment and a vertical line segment is examined to determine if it is of the type illustrated in FIG. 8A. It is recalled that each line segment may be identified and labeled as a function of its horizontal and vertical coordinates, as represented in the segment table, above. Accordingly, to determine if a horizontal line segment crosses a vertical line segment, the coordinates of the starting and ending points of these line segments are examined. For example, let it be assumed that the horizontal line segment is represented as $L_{1h}$ having starting point coordinates ($x_{1hst}$, $y_{1hst}$) and ending point coordinates ($x_{1hed}$, $y_{1hed}$). Let it be further assumed that the vertical line segment whose adjoining relationship is examined is represented as $L_{1v}$ having starting point coordinates ($x_{1vst}$, $y_{1vst}$) and ending point coordinates ($x_{1ved}$, $y_{1ved}$).

Now, if the horizontal and vertical coordinates of the starting point of the vertical line $L_{1v}$ is greater than the horizontal and vertical coordinates of the starting point of the horizontal line segment $L_{1h}$, and if the horizontal and vertical coordinates of the ending point of the horizontal line segment $L_{1h}$ are greater than the horizontal and vertical coordinates of the ending point of the vertical line segment $L_{1v}$, then these line segments intersect. More particularly, the following conditions establish an adjoining relationship formed of intersecting line segments: $x_{1hst} < x_{1vst}$ and $y_{1hst} < y_{1vst}$ and $x_{1ved} < x_{1hed}$ and $y_{1ved} < y_{1hed}$. If the foregoing conditions are met, inquiry 330 is answered in the affirmative and the routine advances to instruction 336 to identify these two line segments $L_{1h}$ and $L_{1v}$ as being part of a grid forming a table.

Figure 8B:
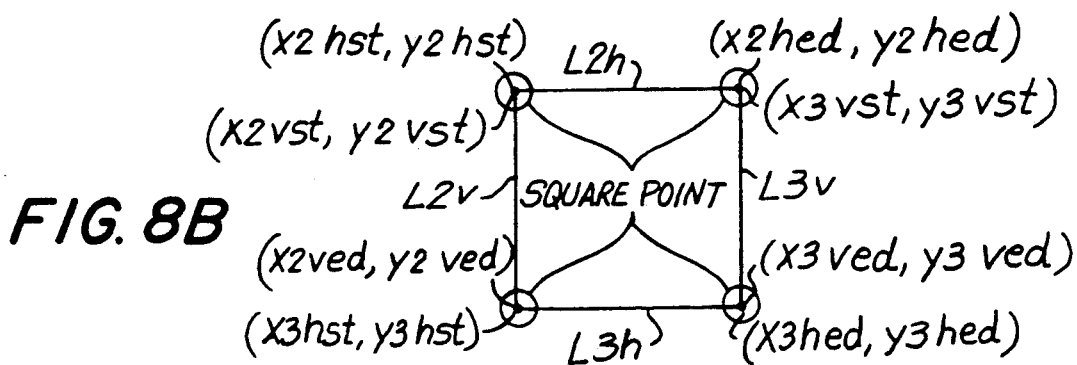
Figure 8C:
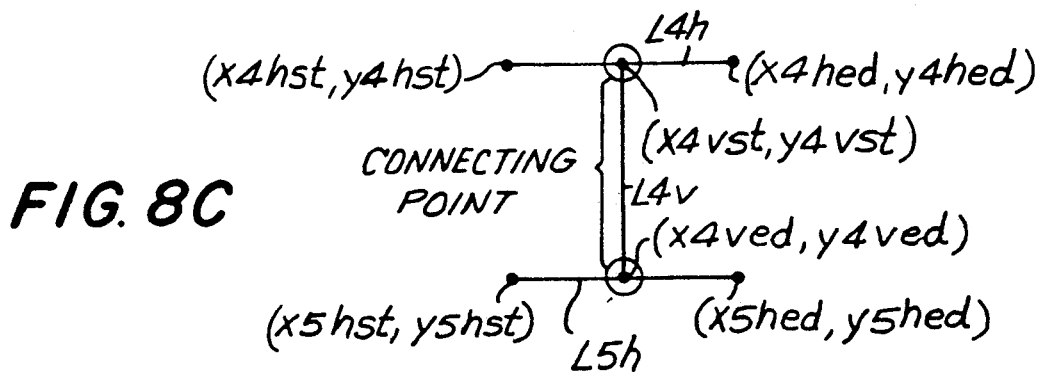

However, if inquiry 330 is answered in the negative, inquiry 332 is made to determine if the horizontal line segment under examination connects with a vertical line segment. FIG. 8C illustrates two connecting points formed of a vertical line segment $L_{4v}$ which adjoins a horizontal line segment $L_{4h}$ and which also adjoins a horizontal line segment $L_{5h}$. A comparison of FIGS. 8A and 8C results in the observation that a connecting point differs from an intersecting point in that the horizontal and vertical line segments which form a connecting point do not cross.

A connecting point is determined by sensing if the starting point of, for example, the vertical line segment $L_{4v}$ is disposed on the horizontal line segment $L_{4h}$, or whether the ending point of line segment $L_{4v}$ is disposed on the horizontal line segment $L_{5h}$.

Let it be assumed that horizontal line segment $L_{4h}$ admits of the starting point coordinates ($x_{4hst}$, $y_{4hst}$) and the ending point coordinates ($x_{4hed}$, $y_{4hed}$). Similarly, let it be assumed that the horizontal line segment $L_{5h}$ admits of the starting point coordinates ($x_{5hst}$, $y_{5hst}$) and the ending point coordinates ($x_{5hed}$, $y_{5hed}$). Finally, let it be assumed that the vertical line segment $L_{4v}$ admits of the starting point coordinates ($x_{4vst}$, $y_{4vst}$) and the ending point coordinates ($x_{4ved}$, $y_{4ved}$). A connecting point between horizontal and vertical line segments is determined by the following conditions:

$$x_{4hst} < x_{4vst} < x_{4hed} \text{ and } y_{4hst} = y_{4vst} = y_{4hed}$$

or $$x_{5hst} < x_{4ved} < x_{5hed} \text{ and } y_{5hst} = y_{4ved} = y_{5hed}$$

If inquiry 332 is answered in the affirmative, the routine advances to instruction 336 and the connecting line segments are identified as being part of the grid of a table. However, if this inquiry is answered in the negative, the routine advances to inquiry 334.

Inquiry 334 determines whether the adjoining relationship between a horizontal line segment and a vertical line segment forms a corner point. As illustrated in FIG. 8B, horizontal line segment $L_{2h}$ forms a corner point with vertical line segment $L_{2v}$, and also with vertical line segment $L_{3v}$. Similarly, horizontal line segment $L_{3h}$ forms a corner point with each of vertical line segments $L_{2v}$ and $L_{3v}$. Horizontal line segment $L_{2h}$ admits of starting point coordinates ($x_{2hst}$, $y_{2hst}$) and ending point coordinates ($x_{2hed}$, $y_{2hed}$). Horizontal line segment $L_{3h}$ admits of the starting point coordinates ($x_{3hst}$, $y_{3hst}$) and the ending point coordinates ($x_{3hed}$, $y_{3hed}$). Similarly, the vertical line segment $L_{2v}$ admits of the starting point coordinates ($x_{2vst}$, $y_{2vst}$) and the ending point coordinates ($x_{2ved}$, $y_{2ved}$). Finally, the vertical line segment $L_{3r}$ admits of the starting point coordinates ($x_{3vst}$, $y_{3vst}$) and the ending point coordinates ($x_{3ved}$, $y_{3ved}$). As is apparent from FIG. 8B, a corner point is formed by any of the following conditions:

$$x_{2hst} = x_{2vst} \text{ and } y_{2hst} = y_{2vst}$$

or $$x_{2hed} = x_{3vst} \text{ and } y_{2hed} = y_{3vst}$$

or $$x_{3hst} = x_{2ved} \text{ and } y_{3hst} = y_{2ved}$$

or $$x_{3hed} = x_{3ved} \text{ and } y_{3hed} = y_{3ved}$$

If any of these conditions is satisfied, inquiry 334 is answered in the affirmative and the routine advances to instruction 338 to identify the adjoining horizontal and vertical line segments as part of a block pattern. However, if inquiry 334 is answered in the negative, it is assumed that neither an intersecting point nor a connecting point nor a corner point is present. Hence, the routine advances to instruction 340 to identify the line segment under examination simply as a line.

Figure 9A:
FIGS. 9A-9C illustrate those patterns which are detected as a function of the adjoining relationships illustrated in FIGS. 8A-8C.
Figure 9B:
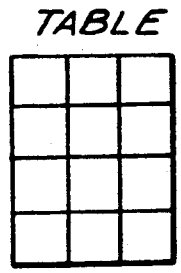
Figure 9C:
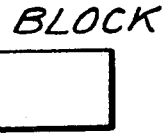

By reason of inquiries 330-334 and instructions 336-340, the particular pattern in which the line segment under examination is included may be determined. FIG. 9 illustrates these patterns as a table, shown as a grid work, in the event that instruction 336 is executed; a block, formed simply as an outline comprised of horizontal and vertical line segments, in the event that instruction 338 is executed; and a simple line in the event that instruction 340 is executed. It is appreciated that the outlining boundary of the table shown in FIG. 9B is present if inquiry 332 is answered in the affirmative; and if this inquiry is answered in the negative, then the table does not include such an outlining border.

After executing instruction 336 or instruction 338 or instruction 340, the routine advances to inquire, at 342, if there are other line segments awaiting examination. If so, the routine returns to instruction 328 and the foregoing operation is repeated.

Thus, as the routine cycles through the loop from instruction 328 to inquiry 342 and then back to instruction 328, the adjoining relationships of respective horizontal and vertical line segments are determined. Consequently, each line, each table and each block that may be provided on the document are identified; and the respective coordinate locations of the integral parts thereof are identified.

After all of the previously identified horizontal and vertical line segments are examined, inquiry 342 is answered in the negative and the routine advances to instruction 344 to determine the size and location of each line, block and table that has been identified. By doing so, each such pattern may be erased, thereby facilitating recognition of the characters that may be within or adjacent the identified pattern. Still further, by identifying, locating and determining the size of each such pattern, the pattern itself may be processed separately so as to be reproduced, enlarged or reduced. Moreover, in the event that the character recognition equipment with which the present invention is used does not function to recognize graphic figures, such as photographs, the pattern identifying algorithm described above can be used simply to obviate an attempt to recognize picture data that may be included in an identified block or table.

While the present invention has been particularly shown and described with reference to preferred embodiments, it will be readily apparent to those of ordinary skill in the art that various changes and modifications may be made without departing from the scope and spirit of the invention. For example, in the described embodiments, after one line element is examined, its neighborhood is searched for an adjacent line element whose connection relationship is determined. Alternatively, each scan line, that is, each bit-mapped picture data arranged generally along the horizontal axis, may be examined to determine if that scan line includes one or more line elements. After all scan lines are examined, the vertical separation and connection relationship between scan lines then may be determined.

It also is appreciated that the flow charts shown in FIGS. 1A-1C are intended to provide general explanations of the manner in which the processor operates. The particular inquiries and instructions set out in these flow charts may be varied; their particular order or sequence may be modified; and various inquiries or instructions may be omitted or added. For example, in FIG. 1C, inquiry 332 may be deleted.

It is intended that the appended claims be interpreted as including the embodiments described herein, those modifications mentioned above, and all equivalents thereto.

What is claimed is:

1. A method of detecting line segments in stored picture data representing line and character indicia derived from an optically scanned document, comprising the steps of: (a) detecting line elements from said picture data; (b) determining if the length of a line element is greater than a threshold length $l_{th}$; (c) determining a connecting relationship of one line element of greater than threshold length to another line element of greater than threshold length extending in substantially the same direction as and overlapping said one line element by determining if a vertical separation between said one and other line elements is less than a preselected amount $\delta V$; and (d) identifying a line segment as being comprised of said one and other line elements in accordance with the connecting relationship of the line elements.

2. The method of claim 1 wherein the step of detecting line elements includes determining if adjacent line elements are separated and, if so, determining if the separation is less than a predetermined amount $\delta d$; and linking the line elements separated by less than $\delta d$ to form a detected line element.

3. The method of claim 2 wherein the stored picture data comprises pixels and wherein the step of detecting line elements further includes the step of detecting pixels which extend generally along a predetermined axis.

4. The method of claim 1 wherein said step of determining a connecting relationship further comprises determining if said one and other line elements having vertical separation less than $\delta V$ exhibit a predetermined horizontal relationship.

5. The method of claim 4 wherein each line element includes starting and ending points having horizontal and vertical locations; and wherein said predetermined horizontal relationship comprises the horizontal location of the starting point of one line element being disposed at or between the horizontal locations of the starting and ending points of the other line element.

6. A method of detecting line segments in stored picture data representing line and character indicia derived from an optically scanned document, comprising the steps of: (a) detecting line elements from said picture data; (b) determining if the length of a line element is greater than a threshold length $l_{th}$; (c) determining a connecting relationship of one line element of greater than threshold length to another line element of greater than threshold length, each of said one and other line elements including starting and ending points having horizontal and vertical locations, where the horizontal location of the starting point of the one line element is disposed at or between the horizontal locations of the starting and ending points of the other line element; (d) identifying a line segment in accordance with the connecting relationship of the line elements; and (e) enlarging the identified line segment by expanding the horizontal location of the starting point of said one line element to be substantially equal to the horizontal location of the starting point of said other line element and by expanding the horizontal location of the ending point of said other line element to be substantially equal to the horizontal location of the ending point of said one line element.

7. The method of claim 6, further comprising the step of deleting from the stored picture data that data therein corresponding to the enlarged line segment.

8. The method of claim 6, wherein the identified line segment is comprised of more than two line elements, each line element being adjacent to at least one other line element, vertically separated therefrom by less than $\delta V$ and having a starting or ending point disposed at or between the horizontal locations of the starting and ending points of those line elements adjacent thereto.

9. The method of claim 1, further comprising the step of enlarging the identified line segment to have an expanded area.

10. The method of claim 9, further comprising the step of deleting from the stored picture data the line indicia corresponding to the enlarged line segment.

11. A method of detecting line segments in stored picture data representing line and character indicia derived from an optically scanned document, comprising the steps of: (a) detecting line elements from said picture data; (b) determining if the length of a line element is greater than a threshold length $l_{th}$; (c) determining a connecting relationship of one line element of greater than threshold length to another line element of greater than threshold length exhibiting a predetermined horizontal relationship with said one line element; (d) identifying a line segment in accordance with the connecting relationship of the line elements; (e) effectively rotating said stored picture data by approximately 90°; and (f) repeating steps (a) through (d), thereby identifying at least one horizontal line segment and at least one vertical line segment.

12. A method of detecting line segments in stored picture data representing line and character indicia derived from an optically scanned document, comprising the steps of: (a) detecting line elements from said picture data; (b) determining if the length of a line element is greater than a threshold length $l_{th}$; (c) determining a connecting relationship of one line element of greater than threshold length to another line element of greater than threshold length exhibiting a predetermined horizontal relationship with said one line element; (d) identifying a line segment in accordance with the connecting relationship of the line elements; (e) effectively rotating said stored picture data by approximately 90°; (f) repeating steps (a) through (d), thereby identifying at least one horizontal line segment and at least one vertical line segment; (g) detecting if a horizontal line segment adjoins a vertical line segment; (h) determining an adjoining relationship between the horizontal and vertical line segments; and (i) identifying a particular pattern of line segments as a function of said adjoining relationship.

13. The method of claim 12 wherein said step of determining an adjoining relationship comprises determining if the horizontal and vertical line segments cross; and wherein said step of identifying a particular pattern comprises identifying the crossing line segments as a table pattern.

14. The method of claim 12 wherein said step of determining an adjoining relationship comprises determining if the horizontal and vertical line segments connect; and wherein said step of identifying a particular pattern comprises identifying the connecting line segments as a table pattern.

15. The method of claim 12 wherein said step of determining an adjoining relationship comprises determining if the horizontal and vertical line segments form a corner; and wherein said step of identifying a particular pattern comprises identifying the corner-forming line segments as a block pattern.

16. The method of claim 12 wherein said step of determining an adjoining relationship comprises determining if the horizontal and vertical line segments cross or connect or form a corner; and wherein said step of identifying a particular pattern comprises identifying the line segments as part of a table pattern if said line segments cross, identifying the line segments as part of a table pattern if said line segments connect, and identifying the line segments as part of a block pattern if said line segments form a corner.

17. The method of claim 16 wherein said step of identifying a particular pattern further comprises identifying one of the horizontal and vertical line segments as a line segment if it does not cross, connect with or form a corner with another line segment.

18. The method of claim 17 further comprising the steps of determining if several horizontal and vertical line segments cross or connect or form corners; identifying plural table patterns each formed of several crossing or connecting horizontal and vertical line segments; identifying plural block patterns each formed of several corner-forming horizontal and vertical line segments; identifying plural line segments each formed of a non-crossing, non-connecting and non-corner-forming line segment; and determining size and location of each table, block and line segment in said scanned document.

19. Apparatus for detecting line segments in stored picture data representing line and character indicia derived from an optically scanned document, comprising: optical scanning means for scanning a document and producing picture data corresponding to said document; storage means for storing said picture data; and processing means programmed to process the stored picture data to identify line segments therein by (a) detecting line elements from said picture data; (b) determining if the length of a line element is greater than a threshold length $l_{th}$; (c) determining a connecting relationship of one line element of greater than threshold length to another line element of greater than threshold length extending in substantially the same direction as and overlapping said one line element by determining if a vertical relationship between said one and other line elements is less than a preselected amount $\delta V$; and (d) identifying a line segment as being comprised of said one and other line elements in accordance with the connecting relationship of the line elements.

20. The apparatus of claim 19 wherein said processing means is programmed to detect line elements by determining if adjacent line elements are separated and, if so, determining if the separation is less than a predetermined amount $\delta d$, and linking the line elements separated by less than $\delta d$ to form a detected line element.

21. The apparatus of claim 20 wherein said processing means is programmed to determine the separation between line elements extending generally along a predetermined axis.

22. The apparatus of claim 20 wherein said picture data comprises pixels and said storage means comprises means for storing a bit-mapped representation of pixels derived from the scanned document.

23. The apparatus of claim 19 wherein said processing means is further programmed to determine a connecting relationship by determining if said one and other line elements having vertical separation less than $\delta V$ exhibit a predetermined horizontal relationship.

24. The apparatus of claim 23 wherein each line element includes starting and ending points having coordinate locations, and wherein said processing means is programmed to detect said predetermined horizontal relationship by determining if the coordinate location of the starting point of one line element is aligned with or between the coordinate locations of the starting and ending points of the other line element.

25. Apparatus for detecting line segments in stored picture data representing line and character indicia derived from an optically scanned document, comprising: optical scanning means for scanning a document and producing picture data corresponding to said document; storage means for storing said picture data; and processing means programmed to process the stored picture data to identify and enlarge areas of said stored picture data representing line segments by (a) detecting line elements from said picture data; (b) determining if the length of a line element is greater than a threshold length $l_{th}$; (c) determining a connecting relationship of one line element of greater than threshold length to another line element of greater than threshold length, each of the one and other line elements including starting and ending points having coordinate locations, where a coordinate location of the starting point of one line element is aligned with or between the coordinate locations of the starting and ending points of the other line element; (d) identifying a line segment occupying an area of said stored picture data in accordance with the connecting relationship of the line elements; and enlarging said area by expanding the horizontal coordinate location of the starting point of said one line element to be substantially equal to the horizontal coordinate location of said other line element and by expanding the horizontal coordinate location of the ending point of said other line element to be substantially equal to the horizontal coordinate location of the ending point of said one line element.

26. The apparatus of claim 25 wherein the processing means is further programmed to delete from said stored picture data the data corresponding to the enlarged area of the line segment.

27. The apparatus of claim 25 wherein the identified line segment is comprised of more than two line elements, each line element being adjacent to at least one other line element and vertically separated therefrom by less than a preselected amount $\delta V$; and wherein said processing means is further programmed to detect tilt in said line segment by sensing a starting or ending point of one line element at or between the horizontal coordinate locations of the starting and ending points of those line elements adjacent thereto.

28. The apparatus of claim 19 wherein the identified line segment occupies an area of said stored picture data; and said processing means is further programmed to enlarge the area occupied by said identified line segment.

29. The apparatus of claim 28 wherein the processing means is further programmed to delete from the stored picture data the data corresponding to the enlarged area of said identified line segment.

30. Apparatus for detecting lines segments in stored picture data representing line and character indicia derived from an optically scanned document, comprising: optical scanning means for scanning a document and producing picture data corresponding to said document; storage means for storing said picture data; and processing means programmed to process the stored picture data to identify line segments therein by (a) detecting line elements from said picture data; (b) determining if the length of a line element is greater than a threshold length $l_{th}$; (c) determining a connecting relationship of one line element of greater than threshold length to another line element of greater than threshold length exhibiting a predetermined horizontal relationship with said one line element; (d) identifying a line segment in accordance with the connecting relationship of the line elements; and (e) effectively rotating said stored picture data by approximately 90° and re-executing operations (a) through (d), thereby identifying at least one horizontal line segment ad at least one vertical line segment.

31. Apparatus for detecting line segments in stored picture data representing line and character indicia derived from an optically scanned document, comprising: optical scanning means for scanning a document and producing picture data corresponding to said document; storage means for storing said picture data; and processing means programmed to process the stored picture data to identify line segments therein by (a) detecting line elements from said picture data; (b) determining if the length of a line element is greater than a threshold length $l_{th}$; (c) determining a connecting relationship of one line element of greater than threshold length to another line element of greater than threshold length exhibiting a predetermined horizontal relationship with said one line element; (d) identifying a line segment in accordance with the connecting relationship of the line elements; (e) effectively rotating said stored picture data by approximately 90°; (f) re-executing operations (a) through (d), thereby identifying at least one horizontal line segment and at least one vertical line segment; (g) detecting if a horizontal line segment adjoins a vertical line segment; (h) determining an adjoining relationship between the horizontal and vertical line segments; and (i) identifying a particular pattern of line segments as a function of said adjoining relationship.

32. The apparatus of claim 31 wherein said processing means is programmed to determine an adjoining relationship by determining if the horizontal and vertical line segments cross and, if so, to identify the particular pattern as a table pattern.

33. The apparatus of claim 31 wherein said processing means is programmed to determine an adjoining relationship by determining if the horizontal and vertical line segments connect and, if so, to identify the particular pattern as a table pattern.

34. The apparatus of claim 31 wherein said processing means is programmed to determine an adjoining relationship by determining if the horizontal and vertical line segments form a corner and, if so, to identify the particular pattern as a block pattern.

35. The apparatus of claim 31 wherein said processing means is programmed to determine an adjoining relationship by determining if the horizontal and vertical line segments cross or connect or form a corner and to identify the particular pattern as part of a table pattern if said line segments cross, as part of a table pattern if said line segments connect, and as part of a block pattern if said line segments form a corner.

36. The apparatus of claim 35 wherein said processing means is further programmed to identify one of the horizontal and vertical line segments as a line segment if it does not cross, connect with or form a corner with another line segment.

37. The apparatus of claim 36 wherein said processing means is further programmed to determine if several horizontal and vertical line segments cross or connect or form corners, to identify plural table patterns each formed of several crossing or connecting horizontal and vertical line segments, to identify plural block patterns each formed of several corner-forming horizontal and vertical line segments, to identify plural line segments each formed of a non-crossing, non-connecting and non-corner-forming line segment, and to determine size and location of each table, block and line segment in said scanned document.

* * * * *